United States Patent
Wang et al.

(10) Patent No.: US 12,248,541 B1
(45) Date of Patent: Mar. 11, 2025

(54) WATERMARK EMBEDDING METHOD BASED ON SERVICE INVOCATION DATA

(71) Applicant: China National Institute of Standardization, Beijing (CN)

(72) Inventors: Mengxiang Wang, Beijing (CN); Yucheng Zhang, Beijing (CN); Qiang Fu, Beijing (CN); Fujun Wan, Beijing (CN); Xinyao Zhou, Beijing (CN); Na Liu, Beijing (CN)

(73) Assignee: China National Institute of Standardization, Beijing (CN)

( * ) Notice: Subject to any disclaimer, the term of this patent is extended or adjusted under 35 U.S.C. 154(b) by 0 days.

(21) Appl. No.: 18/805,460

(22) Filed: Aug. 14, 2024

(30) Foreign Application Priority Data

Mar. 29, 2024 (CN) .......................... 202410373303.1

(51) Int. Cl.
*G06F 21/16* (2013.01)
*G06F 17/14* (2006.01)

(52) U.S. Cl.
CPC .............. *G06F 21/16* (2013.01); *G06F 17/14* (2013.01)

(58) Field of Classification Search
CPC .......... G06F 21/16; G06F 21/30; G06F 21/60; G06F 21/62; G06F 17/00; G06F 17/10; G06F 17/14
See application file for complete search history.

(56) References Cited

U.S. PATENT DOCUMENTS

| | | | | |
|---|---|---|---|---|
| 8,032,754 B2 * | 10/2011 | Mihcak | .................. | G06T 1/005 713/176 |
| 8,050,452 B2 * | 11/2011 | Bradley | ............. | H04N 1/32197 382/100 |
| 8,175,329 B2 * | 5/2012 | Alattar | ............... | H04N 1/32144 382/100 |
| 8,505,108 B2 * | 8/2013 | Rhoads | .............. | G06V 30/1423 713/176 |
| 8,792,675 B2 * | 7/2014 | Reed | .................. | H04N 1/32352 380/54 |
| 10,147,433 B1 * | 12/2018 | Bradley | ................. | G10L 19/018 |

(Continued)

FOREIGN PATENT DOCUMENTS

| CN | 112613072 A | 4/2021 |
|---|---|---|
| CN | 116957893 A | 10/2023 |

(Continued)

*Primary Examiner* — Hosuk Song

(57) ABSTRACT

The present invention discloses a watermark embedding method based on service invocation data, comprising obtaining service invocation data, and preprocessing the invocation data, then, obtaining the key data through screening the preprocessed invocation data based on relevant weights, then, adding timestamps to the key data to obtain enhanced data, after that, selecting the contribution degree of the enhanced data to obtain high-quality data, and encoding the high-quality data to generate encoded data, then, constructing a data watermark embedding model by employing the encoded data, and inputting the service invocation data to be embedded into the data watermark embedding model, and thus the embedding results can be output. This method can not only improve the accuracy of watermark embedding for service invocation data, but also provides good interpretability, making it directly applicable to watermark embedding systems.

9 Claims, 2 Drawing Sheets

(56) References Cited

U.S. PATENT DOCUMENTS

| | | | |
|---|---|---|---|
| 11,113,781 B2 * | 9/2021 | Sedighianaraki | G06T 1/0092 |
| 11,587,432 B2 * | 2/2023 | Rhoads | H04N 23/611 |
| 11,900,497 B1 * | 2/2024 | Falkenstern | B41M 3/10 |
| 2011/0055585 A1 | 3/2011 | Lee | |

FOREIGN PATENT DOCUMENTS

| | | |
|---|---|---|
| CN | 117439799 A | 1/2024 |
| WO | 9917536 A1 | 4/1999 |

* cited by examiner

WATERMARK EMBEDDING METHOD BASED ON SERVICE INVOCATION DATA

CROSS-REFERENCE TO RELATED APPLICATIONS

This application claims priority of Chinese Patent Application No. 202410373303.1, filed on Mar. 29, 2024, the entire contents of which are incorporated herein by reference.

TECHNICAL FIELD

The present invention involves the field of watermark embedding, particularly to a watermark embedding method based on service invocation data.

BACKGROUND TECHNOLOGY

With the rapid development of information technology, it is imperative to enhance the protection and copyright management of digital content. Therefore, digital watermarking technology is widely utilized to achieve effective traceability and copyright protection of digital content. Digital watermarking is a technical means of embedding specific information into digital content that is not easily detected or destroyed. It can be utilized to identify the source of content, track unauthorized duplication and distribution, and provide functions such as tampering detection.

The embedding of watermarks in service invocation data also needs to consider the integrity, availability, and security of the data. During the process of embedding the watermark, it is essential to minimize any impact on the original data in order to avoid disrupting normal data processing and analysis. Meanwhile, the embedded watermark information must have a certain level of robustness to resist data tampering and attacks.

Therefore, it is urgent to develop a watermark embedding method suitable for service invocation data that can realize the copyright traceability and protection while guaranteeing the data integrity and availability.

SUMMARY OF THE INVENTION

The purpose of the present invention is to provide a watermark embedding method based on service invocation data.

For the purpose of achieving the above objectives, the present invention is implemented according to the following technical scheme:

The present invention comprises the following steps:

Obtaining service invocation data, and preprocessing the invocation data;

Obtaining the key data through screening the preprocessed invocation data based on relevant weights, then, adding timestamps to the key data to obtain enhanced data;

Selecting the contribution degree of the enhanced data to obtain high-quality data, then, encoding the high-quality data to generate encoded data;

Constructing a data watermark embedding model by employing the encoded data; and then, inputting the service invocation data to be embedded into the data watermark embedding model, and thus the embedding results can be output.

Further, the method for obtaining the key data through screening the preprocessed invocation data based on relevant weights, including: calculating the relevant weights applied to the invocation data:

$$df(E, C, s_a) = \frac{|C[E] - s_a[E]|}{\max(E) - \min(E)}$$

$$m(E) = m_o(E) - \sum_{a=1}^{n} \frac{df(E, C, s_a)}{n+g} + \sum_{b \neq cs(C)} \frac{\left[\frac{\ell(b)}{1-\ell(cs(C))} \sum_{a=1}^{n} df(E, C, g_a)\right]}{n+g}$$

wherein, the maximum value of data E is represented by $\max(E)$, the minimum value of data E is represented by $\min(E)$, and the relevant weight of data E is represented by $m(E)$, the initial relevant weight of data E is represented by $m_o(E)$, and the proportion of the category to which data E belongs in random sampling C is represented by $\ell(cs(C))$, the proportion of data invoked by class b is represented by $\ell(b)$, the $a^{th}$ nearest neighbor data of class b invocation data is represented by $g_a$, the data value of correlation E is represented by $C[E]$, the sampling data value of the $a^{th}$ invocation data E of the nearest neighbor is represented by $s_a[E]$, the $a^{th}$ sampling data is represented by $s_a$, the category to which data belongs in random sampling C is represented by $cs(C)$, and the number of sampled data is represented by $n$, in addition, the nearest neighbor data is represented by g, the difference in correlation E between the invocation data C and the sampling data $s_a$ is represented by $df(E, C, s_a)$, and the difference in nearest neighbor $g_a$ between the invocation data C and the sampling data $s_a$ is represented by $df(E, C, g_a)$;

Performing a descending sort on the invocation data according to the relevant weights, presetting a threshold for these weights, and subsequently screening the dependent sets based on this threshold;

Mapping the position of the exploratory factor and the dependent set, and the expression is:

$$q_{i,a} = \begin{cases} 1, r > \mathcal{T}(q_{i,a}) \\ 0, r \leq \mathcal{T}(q_{i,a}) \end{cases}$$

$$\mathcal{T}(q_{i,a}) = \frac{1}{1+e^{-q_{i,a}}}$$

wherein, the mapping function is represented by $\mathcal{T}(\cdot)$, the $a^{th}$ data related to the $i^{th}$ exploratory factor is represented by $q_{i,a}$, the random number is represented by r, and the natural constant is represented by e, then, calculating the fitness value of the exploratory factor:

$$\mathcal{R} = \alpha \cdot er + \omega \cdot \frac{M_t}{M}$$

wherein, the fitness is represented by R, the misclassification rate is represented by er, the number of data in the dependent set is represented by M, the importance of the misclassification rate is represented by α, the importance of the dependent subset is represented by ω, and the number of selected dependent subsets is represented by $M_L$;

Comparing the fitness of the exploratory factor, updating the global and local optimal solutions, and updating the position of exploratory factor, and the expression is:

$$\dot{\theta}_{i,d} = \psi \cdot \theta_{i,d} + \beta_1 r_1 (bs_{i,d} - \theta_{i,d}) + \beta_2 r_2 (qs_{i,d} - \theta_{i,d})$$

$$\dot{q}_{i,d} = q_{i,d} + \theta_{i,d}$$

wherein, the velocity of the $i^{th}$ exploratory factor in the d-dimension is represented by $\theta_{i,d}$, the position of the $i^{th}$ exploratory factor in the d-dimension is represented by $q_{i,d}$, the inertia weight of the exploratory factor is represented by $\psi$, and the learning factors are represented by $\beta_1$ and $\beta_2$, in addition, the random constants are represented by $r_1$ and $r_2$, the global optimal position is represented by $qs_{i,d}$, the individual optimal position is represented by $bs_{i,d}$, and the updated position of the exploratory factor is represented by $\dot{\theta}_{i,d}$;

Implementing an adaptive t-distribution perturbation strategy, iterating continuously until the maximum number of iterations is reached, and then, outputting the screened remaining data as the key data.

Further, the method for adding timestamps to the key data to obtain enhanced data; including:

Calculating the nearest point and the distance to the key data:

$$S_c^{(p)} = \frac{\sum_{d=1}^{e} |Q_{cd} Q_{pd}|}{\sqrt{\sum_{d=1}^{e} Q_{cd}^2} \sqrt{\sum_{d=1}^{e} Q_{pd}^2}}$$

wherein, the distance from the $p^{th}$ nearest neighbor point to the $c^{th}$ key data point is represented by $S_c^{(p)}$, the dimension is represented by d, the number of dimensions is represented by e, the $c^{th}$ sample in the $d^{th}$ dimension is represented by $Q_{cd}$, and the $p^{th}$ nearest neighbor point in the $d^{th}$ dimension is represented by $Q_{pd}$;

Calculating the sum of distances from the nearest neighbors of the sample point to the key data:

$$Z_c^g = \sum_{p=1}^{g} S_c^{(p)}$$

wherein, the number of the nearest neighbors is represented by $g$, and the sum of the distances between the $c^{th}$ key data and the nearest neighbors is represented by $Z_c^g$;

Performing a descending sort according to the sum of distances, presetting the range of values for the neighborhood parameters, and distributing the neighborhood parameters equally to the neighborhood based on the sum of distances between the key data and the neighboring points, and the expression is:

$$\mathcal{J} \in [\mathcal{J}_{min}, \mathcal{J}_{max}]$$

$$\mathcal{J} = \zeta(\mathcal{J}_{max} + \mathcal{J}_{min}) - (Z_c^g - Z_1^g) \times \frac{\mathcal{J}_{max} - \mathcal{J}_{min}}{Z_{max}^g - Z_1^g} + \mathcal{J}_{min}$$

wherein, the neighborhood parameter is represented by $\mathcal{J}$, the maximum value of the neighborhood parameter is represented by $\mathcal{J}_{max}$, and the minimum value of the neighborhood parameter is represented by $\mathcal{J}_{min}$, in addition, the sum of the distances between the first key data and the neighboring points is represented by $Z_1^g$, the control parameter is represented by $\zeta$, and the maximum value of the sum of distances between the key data and the neighboring points is represented by $Z_{max}^g$;

Calculating the weights of local neighbors and the weights of the original local linear structure:

$$\chi_{h_{cy}} = 1 - \frac{\psi_{cy} S_c^{(\mathcal{J}_y)}}{Z_c^\mathcal{J}}$$

$$\chi_L = \underset{\chi_L}{\operatorname{argmin}} \left\| Q_c - \sum_{y=1}^{\sigma} \chi_w U_c^y \right\|_2^2$$

wherein, the enhanced weight is represented by $\chi_w$, the weight of the neighboring sequence structure between the key data $Q_c$ and the $y^{th}$ neighbor is represented by $U_c^y$, the weight of the original local linear structure is represented by $\chi_L$, and the 2-norm function is represented by $\|\cdot\|_2$, in addition, the $y^{th}$ neighbor of the key data is represented by $U_c^y$, the $c^{th}$ key data is represented by $Q_c$, the minimum parameter value function is represented by $\operatorname{argmin}(\cdot)$, and the attenuation coefficient between the $c^{th}$ key data and the $y^{th}$ neighbor is represented by $\psi_{cy}$;

Calculating the importance weight:

$$\phi = \delta_1 \chi_h + \delta_2 \chi_L$$

wherein, the importance weight is represented by $\phi$, the weight of the neighboring sequence structure is represented by $\chi_h$, the sequence coefficient is represented by $\delta_1$, and the linear coefficient is represented by $\delta_2$;

Taking the nearest neighbor points corresponding to the importance weights greater than or equal to 0.372 as insertion points for timestamps, and then, the enhanced data can be output by inserting timestamps.

Further, the method for selecting the contribution degree of the enhanced data to obtain high-quality data, including:

Calculating the distance between the enhanced data:

$$p_{js} = \frac{k_{js}}{W+1} + \frac{W \varpi_{js}}{W+1}$$

wherein, the dissimilarity degree between the $j^{th}$ and the $s^{th}$ data is represented by $\varpi_{js}$, the distance between the $j^{th}$ and $s^{th}$ data is represented by $\rho_{js}$, the conditional probability is represented by W, and the numerical distance between the $j^{th}$ and the $s^{th}$ data is represented by $k_{js}$;

Calculating the cumulative contribution of the enhanced data:

$$\mathcal{U} = \upsilon \sum_{j=1}^{N} \frac{\sum_{j=1}^{N} \frac{F_{js}}{\sum_{s=1}^{m} \frac{p F_{js}}{F}}}{m} \cdot \xi_j$$

wherein, the cumulative contribution degree is represented by $\mathcal{U}$, the $j^{th}$ explained variance ratio is represented by $\xi_j$, the offset value between the $j^{th}$ and the $s^{th}$ data is represented by $F_{js}$, the distance is represented by $\rho$, and the genetic factor is represented by $\upsilon$;

Outputting the enhanced data with a cumulative contribution greater than 1 as high-quality data;

Further, the method for encoding the high-quality data to generate encoded data, including:

Calculating the upper limit of pairwise error probability:

$$H(A \to \acute{A}) \leq -\frac{\|RK(A \to \acute{A})\|_K^2}{4\eta^2}$$

wherein, the channel matrix was represented by R, the precoding matrix is represented by K, the pairwise error probability was represented by H(·), the high-quality data is represented by A, the encoded data is represented by Á, the error rate was represented by $\eta$, and the norm function is represented by $\|\cdot\|$;

Calculating the probability density of channel:

$$C(R) = \frac{1}{\pi^{N,N} dt(V_t)^{N_f}} \cdot \exp\left(-tr\left[(R - R_\tau)^R V^{-1}(R - R_\tau)\right]\right)$$

wherein, the probability density of channel R is represented by $\mathcal{C}(R)$, the mean value of channel is represented by $R_\tau$, the transmission covariance is represented by $V_t$, the transmission inverse matrix is represented by $V^{-1}$, the rank of the matrix is represented by $tr[\cdot]$, the number of channel vectors is represented by N, and the determinant is represented by $dt(\cdot)$, in addition, the number of the $f^{th}$ signal vectors is represented by $N_f$;

Calculating the minimum objective function:

$$\begin{cases} \min Q = tr(R_\tau B^{-1} R_\tau^R) - N_f \log dt(B) \\ B = \frac{\mu_0 \vartheta}{4} V_t K K^R V_t + V_t \\ tr(KK^R) = 1 \end{cases}$$

wherein, the objective function is represented by Q, the minimum distance is represented by D, the inverse matrix of the transmission covariance is represented by $V_t^{-1}$, the adjustment matrix of channel is represented by B, and the adjustment parameter is represented by $\vartheta$, in addition, the precoding matrix of channel R is represented by $K^R$, the code distance of the optimal precoding matrix is represented by $\mu_o$, the inverse matrix of channel adjustment is represented by $B^{-1}$, and the mean value of channel R is represented by $R_\tau^R$;

Working out the constraint objective function, and the expression is:

$$\mathcal{P}(B, \hbar) = tr(R_\tau B^{-1} R_\tau^R) - N_f \log dt(B) + \hbar \left[tr(\varphi) - \vartheta\right]$$

wherein, the Lagrange coefficient is represented by $\hbar$, the constraint objective function of the channel adjustment matrix B and the Lagrange coefficient $\hbar$ is represented by $\mathcal{P}(B, \hbar)$, and the precoding matrix is represented by $\varphi$;

Calculating the optimal encoding matrix:

$$K_o(\acute{A}) = \frac{1}{\sqrt{\vartheta}} M_\varphi Y_\varphi^{\frac{1}{2}} X^R$$

$$\varphi = \vartheta KK^R$$

wherein, the optimal encoding matrix is represented by $K_o(\acute{A})$, the right singular vector is represented by X, and the left singular vector is represented by Y, thus, the encoding data is output based on the optimal encoding matrix.

Further, the method for constructing a data watermark embedding model by employing the encoded data, including:

The data watermark embedding model comprises time series partitioning algorithm, Hash algorithm, Fourier transform algorithm, genetic algorithm, and machine learning algorithm;

The time series partitioning algorithm divides the encoded data into training data and testing data according to the chronological order;

The clustering screening algorithm divides the training data into multiple clusters and excludes data that is far from the clusters in order to obtain selected data;

The Hash algorithm can compute a fixed-length hash value by performing hashing computation on the selected data, and then encrypt important data by utilizing the hash value to obtain the encrypted data;

The Fourier transform algorithm performs transformation of frequency domain on encrypted data to obtain transformed data;

The genetic algorithm can find out optimal embedding position among multiple embedding positions through iterative optimization of the object to be embedded;

The machine learning algorithm can embed the transformed data based on the optimal embedding position.

Secondly, the embodiment of the present application provided an electronic device comprising:

A processor; and a memory arranged to store computer executable instructions, which allows the processor to execute the method described in the first aspect when running the executable instructions.

Thirdly, the embodiment of the present application provided computer-readable storage medium containing one or more programs that enable an electronic device to execute the method described in the first aspect while being executed by the electronic device comprising multiple application programs.

The beneficial effects of the present invention include:

The present invention is a watermark embedding method based on service invocation data. Compared with existing technologies, the present invention has the following technical effects:

The present invention can improve the accuracy of the embedding of watermark in service invocation data through steps including preprocessing, adding timestamps, screening data, data encoding, and constructing model, etc., thereby improving the accuracy of and optimizing the process of the embedding of watermark. In addition, it can not only greatly save resources and improve work efficiency, but also enables the embedding of watermark in service invocation data. This enables real-time implementation of encryption and encoding for embedding watermarks in service invocation data, which is crucial for the specified embedding method. It also possesses a certain universality to adapt to different standards and requirements for watermark embedding methods in service invocation data.

DETAILED DESCRIPTION OF THE EMBODIMENTS

The present invention will be further described through specific embodiments, and the illustrative embodiments and explanations provided herein are utilized to explain the present invention without limiting the present invention.

Figure 1:
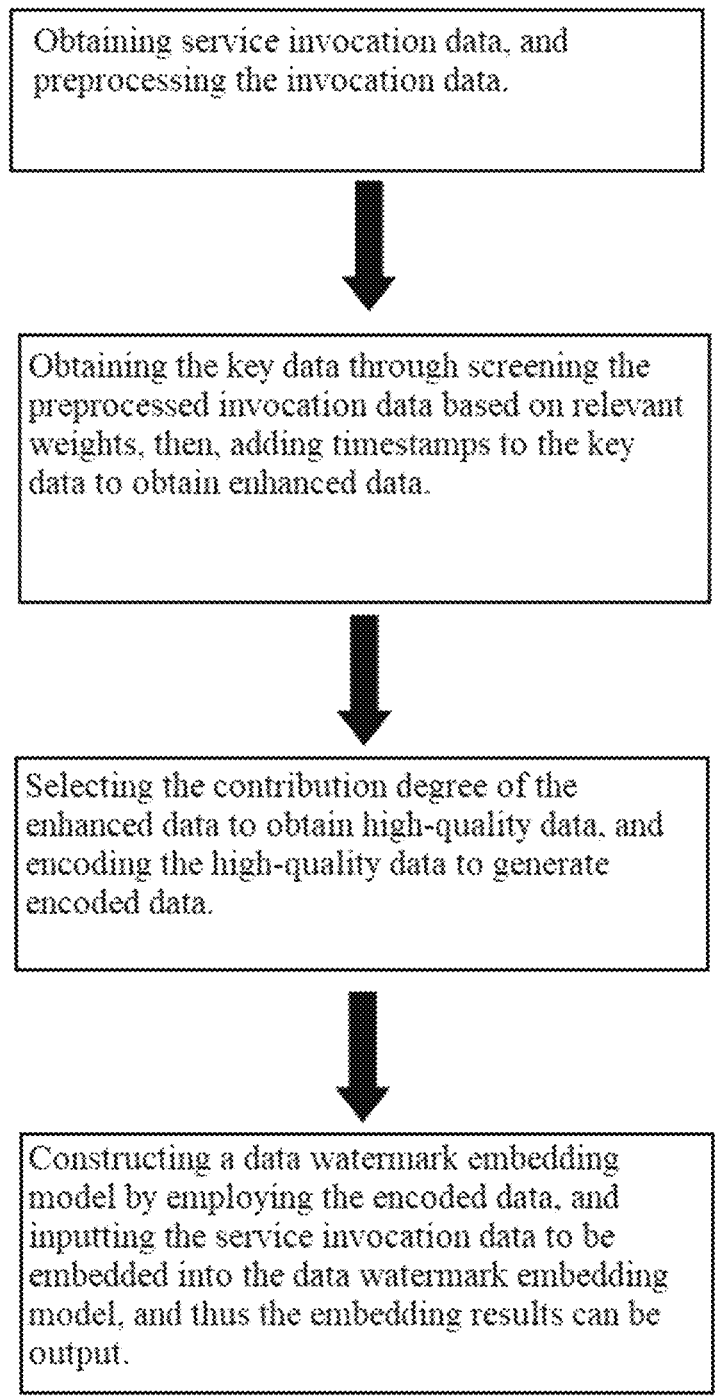
FIG. 1 is a flowchart of the steps of a watermark embedding method based on service invocation data according to the present invention.

The present invention provides a watermark embedding method based on service invocation data, consisting of the following steps:

As shown in FIG. 1, this embodiment consisted of the following steps:

Obtaining service invocation data, and preprocessing the invocation data;

In the practical evaluation, the requested URL was https://api.example.com/users/123, the HTTP method GET was utilized, and the request header was Content Type: application/json—Authorization: Bearer token123; in addition, there was no request body, and the invoked timestamp was 2023-04-01T100:00:00Z, the invoker IP address was 192.168.1.100, and the invocation duration was 200 ms, as well as the invoked service interface name was getUserById; furthermore, the information including whether there were network errors, or whether the service was unavailable and the parameters were correct, the running status indicating success, as well as the processing flow validation request header→query the database→return user information, the user information of execution results had returned successfully, and the response time was 150 ms, the throughput was 100 req/s, the error rate was 0%;

Obtaining the key data through screening the preprocessed invocation data based on relevant weights, then, adding timestamps to the key data to obtain enhanced data;

In the practical evaluation, the key data included that the requested URL was https://api.example.com/users/123, the HTTP method GET was utilized, and the request header was Content Type: application/json—Authorization: Bearer token123, in addition, there was no request body, and the invoked timestamp was 2023-04-01T100:00:00Z, the invoker IP address was 192.168.1.100, and the invocation duration was 200 ms; furthermore, the information including whether there were network errors, or whether the service was unavailable and the parameters were correct, the running status indicating success and the user information of execution results had returned successfully, and the response time was 150 ms, the throughput was 100 req/s, the error rate was 0%;

The enhance data included that the requested URL was https://api.example.com/users/123, the HTTP method GET was utilized, and the request header was Content Type: application/json—Authorization: Bearer token123, in addition, there was no request body, and the invoked timestamp was 2023-04-01T1:00:00 Z, the invoked event timestamp was 2023-04-01T1:00:00 Z, the invoker IP address was 192.168.1.100, the invocation duration was 200 ms; furthermore, the information including whether there were network errors, or whether the service was unavailable and the parameters were correct, the running status indicating success and the user information of execution results had returned successfully, and the response time was 150 ms, the throughput was 100 req/s, the error rate was 0%;

Selecting the contribution degree of the enhanced data to obtain high-quality data, then, encoding the high-quality data to generate encoded data;

In the practical evaluation, the high-quality data included that the requested was URL https://api.example.com/users/123; the Request header was Content Type: application/json—Authorization: Bearer token123, and there was no request body, as well as the invoked timestamp was 2023-04-01T1:00:00 Z, the invoked event timestamp was 2023-04-01T1:00:00 Z, the invocation duration was 200 ms, in addition, the running status indicated success, and the response time was 150 ms, the throughput was 100 req/s, the error rate was 0%;

The encoded data include that the requested URL was https://api.example.com/users/123, the request header was Content Type: application/json—Authorization: Bearer token123, in addition, there was no request body, and the invoked timestamp was 2023-04-01T100:00:00Z, the invoked event timestamp was 2023-04-01T100:00:00Z, the invocation duration was 200 ms, and the running status indicated success, the response time was 150 ms, as well as the throughput was 100 req/s, the error rate was 0%, wherein, the encode were: 00000001, 000000 10, 000000 11, 0, 10111101000110000101, 10111101000110000101010, 11001000, 1, 10010110, 1100100, 0, respectively;

Constructing a data watermark embedding model by employing the encoded data; and then, inputting the service invocation data to be embedded into the data watermark embedding model, and thus the embedding results can be output.

In this embodiment, the method for obtaining the key data through screening the preprocessed invocation data based on relevant weights includes:

Calculating the relevant weights applied to the invocation data:

$$df(E, C, s_a) = \frac{|C[E] - s_a[E]|}{\max(E) - \min(E)}$$

$$m(E) = m_o(E) - \sum_{a=1}^{n} \frac{df(E, C, s_a)}{n+g} + \sum_{b \neq cs(C)} \frac{\left[\frac{\ell(b)}{1 - \ell(cs(C))} \sum_{a=1}^{n} df(E, C, g_a)\right]}{n+g}$$

wherein, the maximum value of data E was represented by max(E), the minimum value of data E was represented by min(E), and the relevant weight of data E was represented by $m$ (E), the initial relevant weight of data E was represented by $m_o$(E), and the proportion of the category to which data E belongs in random sampling C was represented by $\ell(cs(C))$, the proportion of data invoked by class b was represented by $\ell(b)$, the $a^{th}$ nearest neighbor data of class b invocation data was represented by $g_a$, the data value of correlation E was represented by C[E], the sampling data value of the $a^{th}$ invocation data E of the nearest neighbor was represented by $s_a[E]$, the $a^{th}$ sampling data was represented by $s_a$, the category to which data belongs in random sampling C was represented by cs(C), and the number of sampled data was represented by $n$, in addition, the nearest neighbor data was represented by g, the difference in correlation E between the invocation data C and the sampling data $s_a$ was represented by df(E, C, $s_a$), and the difference in nearest neighbor $g_a$ between the invocation data C and the sampling data $s_a$ was represented by df(E, C, $g_a$);

Performing a descending sort on the invocation data according to the relevant weights, presetting a threshold for these weights, and subsequently screening the dependent sets based on this threshold;

Mapping the position of the exploratory factor and the dependent set, and the expression was:

$$q_{i,a} = \begin{cases} 1, r > \mathcal{T}(q_{i,a}) \\ 0, r \leq \mathcal{T}(q_{i,a}) \end{cases}$$

$$\mathcal{T}(q_{i,a}) = \frac{1}{1+e^{-q_{i,a}}}$$

wherein, the mapping function was represented by $\mathcal{T}(\cdot)$, the $a^{th}$ data related to the $i^{th}$ exploratory factor was represented by $q_{i,a}$, the random number was represented by r, and the natural constant was represented by e, then, calculating the fitness value of the exploratory factor:

$$\mathcal{R} = \alpha \cdot er + \omega \cdot \frac{M_t}{M}$$

wherein, the fitness was represented by R, the misclassification rate was represented by er, the number of data in the dependent set was represented by M, the importance of the misclassification rate was represented by $\alpha$, the importance of the dependent subset was represented by $\omega$, and the number of selected dependent subsets was represented by $M_L$;

Comparing the fitness of the exploratory factor, updating the global and local optimal solutions, and updating the position of exploratory factor, and the expression was:

$$\dot{\theta}_{i,d} = \psi \cdot \theta_{i,d} + \beta_1 r_1 (bs_{i,d} - \theta_{i,d}) + \beta_2 r_2 (qs_{i,d} - \theta_{i,d})$$

$$\dot{q}_{i,d} = q_{i,d} + \theta_{i,d}$$

wherein, the velocity of the $i^{th}$ exploratory factor in the d-dimension was represented by $\theta_{i,d}$, the position of the $i^{th}$ exploratory factor in the d-dimension was represented by $q_{i,d}$, the inertia weight of the exploratory factor was represented by $\psi$, and the learning factors were represented by $\beta_1$ and $\beta_2$, in addition, the random constants were represented by $r_1$ and $r_2$, the global optimal position was represented by $qs_{i,d}$, the individual optimal position was represented by $bs_{i,d}$, and the updated position of the exploratory factor was represented by $\dot{\theta}_{i,d}$;

Implementing an adaptive t-distribution perturbation strategy, iterating continuously until the maximum number of iterations is reached, and then, outputting the screened remaining data as the key data.

In this embodiment, the method for adding timestamps to the key data to obtain enhanced data includes:

Calculating the nearest point and the distance to the key data:

$$S_c^{(p)} = \frac{\sum_{d=1}^{e}|Q_{cd}Q_{pd}|}{\sqrt{\sum_{d=1}^{e}Q_{cd}^2}\sqrt{\sum_{d=1}^{e}Q_{pd}^2}}$$

wherein, the distance from the $p^{th}$ nearest neighbor point to the $c^{th}$ key data point was represented by $S_c^{(p)}$, the dimension was represented by d, the number of dimensions was represented by e, the $c^{th}$ sample in the $d^{th}$ dimension was represented by $Q_{cd}$, and the $p^{th}$ nearest neighbor point in the $d^{th}$ dimension was represented by $Q_{pd}$;

Calculating the sum of distances from the nearest neighbors of the sample point to the key data:

$$Z_c^g = \sum_{p=1}^{g} S_c^{(p)}$$

wherein, the number of the nearest neighbors was represented by $g$, and the sum of the distances between the $c^{th}$ key data and the nearest neighbors was represented by $Z_c^g$;

Performing a descending sort according to the sum of distances, presetting the range of values for the neighborhood parameters, and distributing the neighborhood parameters equally to the neighborhood based on the sum of distances between the key data and the neighboring points, and the expression was:

$$\mathcal{J} \in [\mathcal{J}_{min}, \mathcal{J}_{max}]$$

$$\mathcal{J} = \zeta(\mathcal{J}_{max} + \mathcal{J}_{min}) - (Z_c^{\phi} - Z_1^{\phi}) \times \frac{\mathcal{J}_{max} - \mathcal{J}_{min}}{Z_{max}^{\phi} - Z_1^{\phi}} + \mathcal{J}_{min}$$

wherein, the neighborhood parameter was represented by $\mathcal{J}$, the maximum value of the neighborhood parameter was represented by $\mathcal{J}_{max}$, and the minimum value of the neighborhood parameter was represented by $\mathcal{J}_{min}$, in addition, the sum of the distances between the first key data and the neighboring points was represented by $Z_1^{\phi}$, the control parameter was represented by $\zeta$, and the maximum value of the sum of distances between the key data and the neighboring points was represented by $Z_{max}^{\phi}$;

Calculating the weights of local neighbors and the weights of the original local linear structure:

$$\chi_{h_{cy}} = 1 - \frac{\psi_{cy} S_c^{(\mathcal{J}_y)}}{Z_c^{\mathcal{J}}}$$

-continued $$\chi_L = \underset{\chi_L}{\operatorname{argmin}} \left\| Q_c - \sum_{y=1}^{\sigma} \chi_W U_c^y \right\|_2^2$$

wherein, the enhanced weight was represented by $\chi_w$, the weight of the neighboring sequence structure between the key data $Q_c$ and the $y^{th}$ neighbor was represented by $U_c^y$, the weight of the original local linear structure was represented by $\chi_L$, and the 2-norm function was represented by $\|\cdot\|_2$, in addition, the $y^{th}$ neighbor of the key data was represented by $U_c^y$, the $c^{th}$ key data was represented by $Q_c$, the minimum parameter value function was represented by argmin($\cdot$), and the attenuation coefficient between the $c^{th}$ key data and the $y^{th}$ neighbor was represented by $\psi_{cy}$;

Calculating the importance weight:

$$\phi = \delta_1 \chi_h + \delta_2 \chi_L$$

wherein, the importance weight was represented by $\phi$, the weight of the neighboring sequence structure was represented by $\chi_h$, the sequence coefficient was represented by $\delta_1$, and the linear coefficient was represented by $\delta_2$;

Taking the nearest neighbor points corresponding to the importance weights greater than or equal to 0.372 as insertion points for timestamps, and then, the enhanced data can be output by inserting timestamps;

In this embodiment, the method for selecting the contribution degree of the enhanced data to obtain high-quality data includes:

Calculating the distance between the enhanced data:

$$\rho_{js} = \frac{k_{js}}{W+1} + \frac{W \varpi_{js}}{W+1}$$

wherein, the dissimilarity degree between the $j^{th}$ and the $s^{th}$ data was represented by $\overline{\omega}_{js}$, the distance between the $j^{th}$ and $s^{th}$ data was represented by $\rho_{js}$, the conditional probability was represented by $\mathcal{W}$, and the numerical distance between the $j^{th}$ and the $s^{th}$ data was represented by $k_{js}$;

Calculating the cumulative contribution of the enhanced data:

$$\mathcal{U} = \upsilon \sum_{j=1}^{N} \frac{\sum_{j=1}^{N} \frac{F_{js}}{\sum_{s=1}^{m} \rho F_{js}}}{m} \cdot \xi_j$$

wherein, the cumulative contribution degree was represented by $\mathcal{U}$, the $j^{th}$ explained variance ratio was represented by $\xi_j$, the offset value between the $j^{th}$ and the $s^{th}$ data was represented by $F_{js}$, the distance was represented by $\rho$, the genetic factor was represented by $\upsilon$;

Outputting the enhanced data with a cumulative contribution greater than 1 as high-quality data.

In this embodiment, the method for encoding the high-quality data to generate encoded data includes:

Calculating the upper limit of pairwise error probability:

$$H(A \to \acute{A}) \leq -\frac{\|RK(A \to \acute{A})\|_K^2}{4\eta^2}$$

wherein, the channel matrix was represented by R, the precoding matrix was represented by K, the pairwise error probability was represented by H($\cdot$), the high-quality data was represented by A, the encoded data was represented by Á, the error rate was represented by $\eta$, and the norm function was represented by $\|\cdot\|$;

Calculating the probability density of channel:

$$C(R) = \frac{1}{\pi^{N,N} dt(V_t)^{N_f}} \cdot \exp\left(-tr\left[(R - R_T)^R V^{-1}(R - R_\tau)\right]\right)$$

wherein, the probability density of channel R was represented by $\mathcal{C}$(R), the mean value of channel was represented by $R_\tau$, the transmission covariance was represented by $V_t$, the transmission inverse matrix was represented by $V^{-1}$, the rank of the matrix was represented by tr[$\cdot$], the number of channel vectors was represented by N, and the determinant was represented by dt($\cdot$), in addition, the number of the $f^{th}$ signal vectors was represented by $N_f$;

Calculating the minimum objective function:

$$\begin{cases} \min Q = tr(R_\tau B^{-1} R_\tau^R) - N_f \log dt(B) \\ B = \frac{\mu_0 \vartheta}{4} V_t K K^R V_t + V_t \\ tr(KK^R) = 1 \end{cases}$$

wherein, the objective function was represented by Q, the minimum distance was represented by D, the inverse matrix of the transmission covariance was represented by $V_t^{-1}$, the adjustment matrix of channel was represented by B, and the adjustment parameter was represented by $\vartheta$, in addition, the precoding matrix of channel R was represented by $K^R$, the code distance of the optimal precoding matrix was represented by $\mu_o$, the inverse matrix of channel adjustment was represented by $B^{-1}$, and the mean value of channel R was represented by $R_\tau^R$;

Working out the constraint objective function, and the expression was:

$$\mathcal{P}(B, \hbar) = tr(R_\tau B^{-1} R_\tau^R) - N_f \log dt(B) + \hbar [tr(\varphi) - \vartheta]$$

wherein, the Lagrange coefficient was represented by $\hbar$, the constraint objective function of the channel adjustment matrix B and the Lagrange coefficient $\hbar$ was represented by $\mathcal{P}(B, \hbar)$, and the precoding matrix was represented by $\varphi$;

Calculating the optimal encoding matrix:

$$K_o(\acute{A}) = \frac{1}{\sqrt{\vartheta}} M_\varphi Y_\varphi^{\frac{1}{2}} X^R$$

$$\varphi = \vartheta K K^R$$

wherein, the optimal encoding matrix was represented by $K_o(\acute{A})$, the right singular vector was represented by X, and the left singular vector was represented by Y, thus, the encoding data is output based on the optimal encoding matrix.

In this embodiment, the method for constructing a data watermark embedding model by employing the encoded data includes:

The data watermark embedding model comprised time series partitioning algorithm, Hash algorithm, Fourier transform algorithm, genetic algorithm, and machine learning algorithm;

The time series partitioning algorithm divided the encoded data into training data and testing data according to the chronological order;

The clustering screening algorithm divided the training data into multiple clusters, removed data that is far from the clusters, and obtained selected data;

The Hash algorithm could compute a fixed-length hash value by performing hashing computation on the selected data, and then encrypted important data by utilizing the hash value to obtain the encrypted data;

The Fourier transform algorithm performed transformation of frequency domain on encrypted data to obtain transformed data;

The genetic algorithm could find out optimal embedding position among multiple embedding positions through iterative optimization of the object to be embedded;

The machine learning algorithm could embed the transformed data based on the optimal embedding position.

Figure 2:
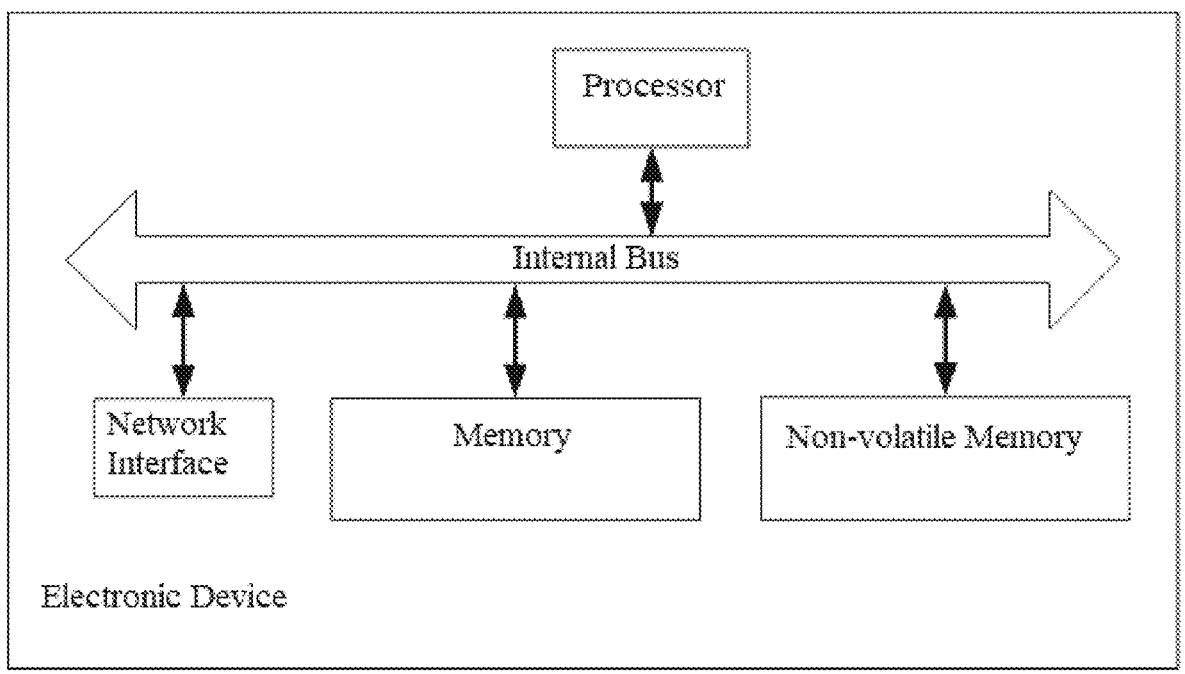
FIG. 2 is a structural schematic diagram of an electronic device described in the embodiments of this specification.

FIG. 2 is a structural schematic diagram of an electronic device utilized in the embodiment of the present application. Referring to FIG. 2, at the hardware level, the electronic device included a processor, and optionally also included the internal bus, the network interfaces, and the memorizer. Wherein, the memorizer could include memory, such as high-speed Random-Access Memory (RAM), and could also include non-volatile memory, such as at least one disk storage. Certainly, the electronic device could also include hardware required for other businesses.

The processor, the network interfaces, and the memorizer could be interconnected through an internal bus, which could be an ISA (Industry Standard Architecture) bus, a PCI (Peripheral Component Interconnect) bus, or an EISA (Extended Industry Standard Architecture) bus. In addition, the bus could be divided into address bus, data bus, and control bus, etc. To facilitate representation, only one bidirectional arrow is utilized in FIG. 2, but it does not indicate that there is only one bus or one type of bus.

The memorizer was utilized to store programs. More precisely, the program referred to program code, including computer operation instructions. The memorizer could include both memory and non-volatile memory, providing instructions and data to the processor.

The processor was utilized to read the corresponding computer program from the non-volatile memory, and then store them into the memory for running. It constituted a user intention recognition device to build multi-dimensional human-computer interaction scenarios at the logical level. In addition, a processor was utilized to execute programs stored in memory, specifically for executing any of the aforesaid watermark embedding methods based on service invocation data.

The aforesaid embodiment shown in FIG. 1 of the present application disclosed a watermark embedding method based on service invocation data. It could be applied to processors or implemented by processors. A processor could be an integrated circuit chip with signal processing capabilities. During the implementation, each step of the above said method could be completed through hardware integrated logic circuits or software instructions in the processor. Such processor could be a general-purpose processor, including the Central Processing Unit (CPU), and the Network Processor (NP), etc.; The Digital Signal Processor (DSP), the Application Specific Integrated Circuit (ASIC), the Field Programmable Gate Array (FPGA), or other programmable logic devices, the discrete gate or transistor logic devices, or discrete hardware components are also available. All of them could implement or execute the disclosed methods, steps, and logic block diagrams described in the embodiments of the present application. A general-purpose processor could be a microprocessor or any conventional processor. The steps of the method disclosed in the embodiments of the present application could be directly reflected as being executed by a hardware decoding processor, or executed by a combination of hardware and software modules in the decoding processor. The software modules could be located in the mature storage media in this field, such as Random-Access Memory, flash memory, Read-Only Memory, Programmable Read-Only Memory, or Electrically Erasable Programmable Read-Only Memory, and registers, etc. Such storage medium was located in the memory, and the processor could access the information from the memory to complete the steps of the method with its hardware.

The electronic device could also execute a watermark embedding method based on service invocation data as shown in FIG. 1, and implement the functions of the embodiment shown in FIG. 1. There is no more detailed description of the embodiments of the present application.

The present embodiment also proposed a computer-readable storage medium that stored one or more programs. Such one or more programs, including the instructions, could perform any of the aforesaid watermark embedding methods based on service invocation data in case that the instructions were executed by an electronic device comprising multiple application programs.

The persons skilled in the art should understand that the embodiments of the present application can be provided in forms of methods, systems, or computer program products. Therefore, the present application supports the embodiments implemented by means of full hardware, or full software, or a combination of software and hardware. Moreover, the present application supports the form of a computer program product implemented on one or more computer-sensitive storage media (including but not limited to disk storage, CD-ROM, and optical memory, etc.) containing computer-sensitive program codes.

The present application is described with reference to the flowchart and/or block diagram of the method, the device (system), and the computer program product according to the embodiments of the application. It should be understood that each process and/or step in the flowchart and/or block diagram, as well as the combination of processes and/or steps in the flowchart and/or block diagram, can be implemented by computer program instructions. These computer program instructions can be provided to the processor of a general-purpose computer, dedicated computer, embedded processor, or other programmable data processing devices to generate a machine, which may create a device for implementing the functions specified in one or more processes in the flowchart and/or one or more steps in the block diagram through the execution of the instructions by the processor of the computer or other programmable data processing devices.

These computer program instructions can also be stored in computer-readable memory which enables a computer or other programmable data processing device to operate in a specific manner, making the instructions stored in the computer-readable memory produce a manufactured product including the instruction device. Such instruction device supports implementing the functions specified in one or more processes in the flowchart and/or one or more steps in the block diagram.

These computer program instructions can also be loaded onto a computer or other programmable data processing devices, enabling a series of operational steps to be executed on the computer or other programmable devices to complete the process by computer, thereby providing steps for implementing the functions specified in one or more processes in the flowchart and/or one or more steps in the block diagram through the instructions executed on the computer or other programmable devices.

In a typical configuration, a computing device consists of one or more processors (CPUs), input/output interfaces, network interfaces, and a memory.

The memory refers to the Volatile Memory, the Random-Access Memory (RAM), and/or the Non-Volatile Memory of the computer-readable media, including the Read-Only Memory (ROM) or the flash RAM. In addition, the memory represents an example of computer-readable media.

The computer-readable media refers to the permanent and non-permanent, removable and non-removable media, which can be utilized to store information by means of any method or technology.

The information refers to computer-readable instructions, data structures, modules of programs, or other data. The examples of storage media for computers include, but are not limited to, Phase Change Memory (PRAM), Static Random-Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memory technologies, Compact Disc Read-Only Memory (CD-ROM), Digital Versatile Disc (DVD) or other optical storage, magnetic cassette tapes, magnetic tape or magnetic disk storage or other magnetic storage devices, or any other non-transmission medium that can be utilized to store information that can be accessed by computing devices. According to the definition described herein, the computer-readable media does not include transitory computer-readable media (transitory media), such as modulated data signals and carriers.

It should be noted that the terms "including", "containing" or any other variation thereof are intended to encompass non-exclusive inclusion, thereby making the process, the method, the goods or equipment consisting of a series of elements not only includes the said elements, but also includes other elements not explicitly listed, or also consists of elements inherent to such process, method, goods or equipment. Without further limitations, the elements defined by the phrase "including a . . . " does not exclude the existence of other identical elements other than the process, method, goods, or device comprising the said elements.

The persons skilled in the art should understand that the embodiments of the present application can be provided in forms of methods, systems, or computer program products. Therefore, the present application supports the embodiments implemented by means of full hardware, or full software, or a combination of software and hardware. Moreover, the present application supports the form of a computer program product implemented on one or more computer-sensitive storage media (including but not limited to disk storage, CD-ROM, and optical memory, etc.) containing computer-sensitive program codes.

The above description is only a preferred embodiment of the present invention without the intention of limiting the present invention. Any modifications, equivalent substitutions, improvements, etc. made within the spirit and principles of the present invention should be included in the scope of protection of the present invention.

The invention claimed is:

1. A watermark embedding method based on service invocation data, characterized by comprising the following steps:

obtaining invocation data based on service, and preprocessing the invocation data;

obtaining key data through screening the preprocessed invocation data based on relevant weights, then, adding timestamps to the key data to obtain enhanced data; including:

a, calculating relevant weights applied to the invocation data:

$$df(E, C, s_a) = \frac{|C[E] - s_a[E]|}{\max(E) - \min(E)}$$

$$m(E) =$$

$$m_o(E) - \sum_{a=1}^{n} \frac{df(E, C, s_a)}{n+g} + \sum_{b \neq cs(C)} \frac{\left[\frac{\ell(b)}{1 - \ell(cs(C))} \sum_{a=1}^{n} df(E, C, g_a)\right]}{n+g}$$

wherein, a maximum value of data E is represented by max(E), a minimum value of data E is represented by min(E), and a relevant weight of data E is represented by $m$ (E), an initial relevant weight of data E is represented by $m_o$(E), and a proportion of a category to which data E belongs in random sampling C is represented by $\ell$(cs(C)), a proportion of data invoked by class b is represented by $\ell$(b), an $a^{th}$ nearest neighbor data of class b invocation data is represented by $g_a$, a data value of correlation E is represented by C[E], a sampling data value of an $a^{th}$ invocation data E of a nearest neighbor is represented by $s_a$[E], an $a^{th}$ sampling data is represented by $s_a$, a category to which data belongs in random sampling C is represented by cs(C), and a quantity of sampled data is represented by $n$, in addition, a nearest neighbor data is represented by g, a difference in correlation E between an invocation data C and a sampling data $s_a$ is represented by df(E, C, $s_a$), and a difference in nearest neighbor $g_a$ between the invocation data C and the sampling data $s_a$ is represented by df(E, C, $g_a$);

performing a descending sort on the invocation data according to the relevant weights, presetting a threshold for these weights, and subsequently screening the dependent sets based on this threshold;

mapping a position of an exploratory factor and the dependent set, and an expression is:

$$q_{i,a} = \begin{cases} 1, r > \mathcal{T}(q_{i,a}) \\ 0, r \leq \mathcal{T}(q_{i,a}) \end{cases}$$

$$\mathcal{T}(q_{i,a}) = \frac{1}{1 + e^{-q_{i,a}}}$$

wherein, a mapping function is represented by $\mathcal{T}(\cdot)$, the $a^{th}$ data related to the $i^{th}$ exploratory factor is represented by $q_{i,a}$, the random number is represented by r, and the natural constant is represented by e, then, calculating a fitness value of the exploratory factor:

$$R = \alpha \cdot er + \omega \cdot \frac{M_i}{M}$$

wherein, the fitness is represented by R, a misclassification rate is represented by er, the number of data in a dependent set is represented by M, an importance of the misclassification rate is represented by $\alpha$, an importance of a dependent subset is represented by $\omega$, and the number of selected dependent subsets is represented by $M_L$;

comparing the fitness of the exploratory factor, updating a global and local optimal solutions, and updating the position of exploratory factor, and the expression is:

$$\dot{\theta}_{i,d} = \psi \cdot \theta_{i,d} + \beta_1 r_1 (bs_{i,d} - \theta_{i,d}) + \beta_2 r_2 (qs_{i,d} - \theta_{i,d})$$

$$\dot{q}_{i,d} = q_{i,d} + \theta_{i,d}$$

wherein, a velocity of an $i^{th}$ exploratory factor in a d-dimension is represented by $\theta_{i,d}$, the position of the $i^{th}$ exploratory factor in the d-dimension is represented by $q_{i,d}$, an inertia weight of the exploratory factor is represented by $\psi$, and the learning factors are represented by $\beta_1$ and $\beta_2$, in addition, random constants are represented by $r_1$ and $r_2$, a global optimal position is represented by $qs_{i,d}$, an individual optimal position is represented by $bs_{i,d}$, and an updated position of the exploratory factor is represented by $\dot{\theta}_{i,d}$;

implementing an adaptive t-distribution perturbation strategy, iterating continuously until a maximum quantity of iterations is reached, and then, outputting screened remaining data as the key data;

b, calculating a nearest point and the distance to the key data:

$$S_c^{(p)} = \frac{\sum_{d=1}^{e} |Q_{cd} Q_{pd}|}{\sqrt{\sum_{d=1}^{e} Q_{cd}^2} \sqrt{\sum_{d=1}^{e} Q_{pd}^2}}$$

wherein, the distance from the $p^{th}$ nearest neighbor point to a $c^{th}$ key data point is represented by $S_c^{(p)}$, the dimension is represented by d, the number of dimensions is represented by e, a $c^{th}$ sample in the $d^{th}$ dimension is represented by $Q_{cd}$, and the $p^{th}$ nearest neighbor point in the $d^{th}$ dimension is represented by $Q_{pd}$;

calculating a sum of distances from nearest neighbors of a sample point to the key data:

$$Z_c^g = \sum_{p=1}^{g} S_c^{(p)}$$

wherein, the number of the nearest neighbors is represented by $g$, and a sum of the distances between the $c^{th}$ key data and the nearest neighbors is represented by $Z_c^g$;

performing a descending sort according to the sum of distances, presetting a range of values for neighborhood parameters, and distributing the neighborhood parameters equally to a neighborhood based on the sum of distances between the key data and neighboring points, and the expression is:

$$\mathcal{J} \in [\mathcal{J}_{min}, \mathcal{J}_{max}]$$

$$\mathcal{J} = \zeta(\mathcal{J}_{max} + \mathcal{J}_{min}) - (Z_c^g - Z_1^g) \times \frac{\mathcal{J}_{max} - \mathcal{J}_{min}}{Z_{max}^g - Z_1^g} + \mathcal{J}_{min}$$

wherein, the neighborhood parameter is represented by $\mathcal{J}$, the maximum value of the neighborhood parameter is represented by $\mathcal{J}_{max}$, and the minimum value of the neighborhood parameter is represented by $\mathcal{J}_{min}$, in addition, the sum of the distances between a first key data and the neighboring points is represented by $Z_1^g$, the control parameter is represented by $\zeta$, and the maximum value of the sum of distances between the key data and the neighboring points is represented by $Z_{max}^g$;

calculating weights of local neighbors and the weights of an original local linear structure:

$$\chi_{h_{cy}} = 1 - \frac{\psi_{cy} S_c^{(\mathcal{J}_y)}}{Z_c^{\mathcal{J}}}$$

$$\chi_L = \underset{\chi_L}{\arg\min} \left\| Q_c - \sum_{y=1}^{\sigma} \chi_w U_c^y \right\|_2^2$$

wherein, an enhanced weight is represented by $\chi_w$, the weight of a neighboring sequence structure between the key data $Q_c$ and the $y^{th}$ neighbor is represented by $U_c^y$, the weight of the original local linear structure is represented by $\chi_L$, and a 2-norm function is represented by $\|\cdot\|_2$, in addition, a $y^{th}$ neighbor of the key data is represented by $U_c^y$, a $c^{th}$ key data is represented by $Q_c$, the minimum parameter value function is represented by argmin($\cdot$), and an attenuation coefficient between the $c^{th}$ key data and a $y^{th}$ neighbor is represented by $\psi_{cy}$;

calculating the importance weight:

$$\phi = \delta_1 \chi_h + \delta_2 \chi_L$$

wherein, an importance weight is represented by $\phi$, the weight of a neighboring sequence structure is represented by $\chi_h$, the sequence coefficient is represented by $\delta_1$, and a linear coefficient is represented by $\delta_2$;

taking the nearest neighbor points corresponding to the importance weights greater than or equal to 0.372 as insertion points for timestamps, and then, the enhanced data can be output by inserting timestamps;

selecting a contribution degree of enhanced data to obtain high-quality data, then, encoding the high-quality data to generate encoded data; including:

calculating the distance between the enhanced data:

$$\rho_{j\delta} = \frac{k_{j\delta}}{W+1} + \frac{W \varpi_{j\delta}}{W+1}$$

wherein, a dissimilarity degree between a $j^{th}$ and a $s^{th}$ data is represented by $\overline{\omega}_{js}$, the distance between the $j^{th}$ and $s^{th}$ data is represented by $\rho_{js}$, the conditional probability is represented by $\mathcal{W}$, and the numerical distance between the $j^{th}$ and the $s^{th}$ data is represented by $k_{js}$;

calculating a cumulative contribution of the enhanced data:

$$\mathcal{U} = \upsilon \sum_{j=1}^{N} \frac{\sum_{j=1}^{N} \frac{F_{j\delta}}{\sum_{\delta=1}^{m} \frac{\rho F_{j\delta}}{\overline{F}}}}{m} \cdot \xi_j$$

wherein, the cumulative contribution degree is represented by $\mathcal{U}$, the $j^{th}$ explained variance ratio is represented by $\xi_j$, an offset value between the $j^{th}$ and the $s^{th}$ data is represented by $F_{js}$, the distance is represented by $\rho$, a genetic factor is represented by $\upsilon$, and an average offset value is represented by $\overline{F}$;

outputting the enhanced data with a cumulative contribution greater than 1 as high-quality data;

constructing a data watermark embedding model by employing the encoded data; and then, inputting the service invocation data to be embedded into the data watermark embedding model, and thus the embedding results can be output.

2. A watermark embedding method based on service invocation data according to claim 1, characterized in that the method for encoding high-quality data to obtain encoded data consists of:

calculating an upper limit of pairwise error probability:

$$H(A \rightarrow \acute{A}) \leq -\frac{\|RK(A \rightarrow \acute{A})\|_K^2}{4\eta^2}$$

wherein, a channel matrix was represented by R, a precoding matrix was represented by K, a pairwise error probability is represented by H(·), a high-quality data is represented by A, an encoded data is represented by Á, an error rate is represented by η, and the norm function is represented by $\|\cdot\|$;

calculating a probability density of channel:

$$C(R) = \frac{1}{\pi^{N,N} dt(V_t)^{N_f}} \cdot \exp\left(-tr\left[(R - R_\tau)^R V^{-1}(R - R_\tau)\right]\right)$$

wherein, the probability density of channel R is represented by $\mathcal{C}$(R), a mean value of channel is represented by $R_\tau$, a transmission covariance is represented by $V_t$, a transmission inverse matrix is represented by $V^{-1}$, the rank of the matrix is represented by tr[·], the number of channel vectors is represented by N, and a determinant is represented by dt(·), in addition, the number of $f^{th}$ signal vectors is represented by $N_f$;

calculating a minimum objective function:

$$\begin{cases} \min Q = tr(R_\tau B^{-1} R_\tau^R) - N_f \log dt(B) \\ B = \frac{\mu_o \vartheta}{4} V_t K K^R V_t + V_t \\ tr(KK^R) = 1 \end{cases}$$

wherein, an objective function is represented by Q, an inverse matrix of the transmission covariance is represented by $V_t^{-1}$, an adjustment matrix of channel is represented by B, and an adjustment parameter is represented by $\vartheta$, in addition, the precoding matrix of channel R is represented by $K^R$, a code distance of an optimal precoding matrix is represented by $\mu_o$, an inverse matrix of channel adjustment is represented by $B^{-1}$, and a mean value of channel R is represented by $R_\tau^R$;

working out a constraint objective function, and an expression is:

$$\mathcal{P}(B, \hbar) = tr(R_\tau B^{-1} R_\tau^R) - N_f \log dt(B) + \hbar[tr(\varphi) - \vartheta]$$

wherein, the Lagrange coefficient is represented by $\hbar$, the constraint objective function of a channel adjustment matrix B and the Lagrange coefficient $\hbar$ is represented by $\mathcal{P}$(B, $\hbar$), and the precoding matrix is represented by $\varphi$;

calculating an optimal encoding matrix:

$$K_o(\acute{A}) = \frac{1}{\sqrt{\vartheta}} M_\varphi Y_\varphi^{\frac{1}{2}} X^R$$

$$\varphi = \vartheta K K^R$$

wherein, the optimal encoding matrix is represented by $K_o(\acute{A})$, a right singular vector is represented by X, and a left singular vector is represented by Y, thus, the encoding data is output based on the optimal encoding matrix.

3. A watermark embedding method based on service invocation data according to claim 1, characterized in that the method for constructing a data watermark embedding model by employing the encoded data consists of:

the data watermark embedding model comprises a time series partitioning algorithm, Hash algorithm, Fourier transform algorithm, genetic algorithm, and machine learning algorithm;

the time series partitioning algorithm divides the encoded data into training data and testing data according to the chronological order;

a clustering screening algorithm divides training data into multiple clusters and excludes data that is far from clusters in order to obtain selected data;

a Hash algorithm can compute a fixed-length hash value by performing hashing computation on the selected data, and then encrypt important data by utilizing a hash value to obtain encrypted data;

a Fourier transform algorithm performs transformation of frequency domain on encrypted data to obtain transformed data;

a genetic algorithm can find out optimal embedding position among multiple embedding positions through iterative optimization of the object to be embedded;

a machine learning algorithm can embed the transformed data based on the optimal embedding position.

4. An electronic device comprising: a processor; and a memory arranged to store computer executable instructions, which allows the processor to execute the method of claim 1 when running the executable instructions.

5. An electronic device comprising: a processor; and a memory arranged to store computer executable instructions, which allows the processor to execute the method of claim 2 when running the executable instructions.

6. An electronic device comprising: a processor; and a memory arranged to store computer executable instructions, which allows the processor to execute the method of claim 3 when running the executable instructions.

7. A non-transitory computer-readable memory medium containing one or more programs that enable an electronic device to execute the method of claim 1 while being executed by the electronic device comprising multiple application programs.

8. A non-transitory computer-readable memory medium containing one or more programs that enable an electronic device to execute the method of claim 2 while being executed by the electronic device comprising multiple application programs.

9. A non-transitory computer-readable memory medium containing one or more programs that enable an electronic device to execute the method of claim 3 while being executed by the electronic device comprising multiple application programs.

\* \* \* \* \*